(12) United States Patent
Gage

(10) Patent No.: US 10,574,908 B2
(45) Date of Patent: Feb. 25, 2020

(54) SYSTEMS, VEHICLES, AND METHODS FOR AUTOMATICALLY DISPLAYING IMAGE DATA WHEN A VEHICLE IS LOCATED ON AN ON-RAMP TO A ROADWAY

(71) Applicant: Toyota Motor Engineering & Manufacturing North America, Inc., Erlanger, KY (US)

(72) Inventor: Sergei Gage, Redford, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 174 days.

(21) Appl. No.: 15/422,846

(22) Filed: Feb. 2, 2017

(65) Prior Publication Data

US 2018/0126906 A1  May 10, 2018

Related U.S. Application Data

(60) Provisional application No. 62/419,196, filed on Nov. 8, 2016.

(51) Int. Cl.
*H04N 5/272* (2006.01)
*B62D 15/02* (2006.01)
(Continued)

(52) U.S. Cl.
CPC ............ *H04N 5/272* (2013.01); *B60R 1/00* (2013.01); *B62D 15/029* (2013.01);
(Continued)

(58) Field of Classification Search
USPC ....................................................... 348/148
See application file for complete search history.

(56) References Cited

U.S. PATENT DOCUMENTS 7,425,889 B2   9/2008  Widmann et al.
7,571,041 B2   8/2009  Lee et al.
(Continued)

FOREIGN PATENT DOCUMENTS

EP   1129904 A2   9/2001
EP   2103485 A2   9/2009
WO   2011047756 A1   4/2011

OTHER PUBLICATIONS

International Search Report and Written Opinion pertaining to PCT/US2017/057359 filed Oct. 19, 2017 dated Jan. 23, 2018, (15 pages).

*Primary Examiner* — Chikaodili E Anyikire
(74) *Attorney, Agent, or Firm* — Dinsmore & Shohl LLP

(57) ABSTRACT

A system for automatically displaying image data when a vehicle is located on an on-ramp to a roadway includes one or more processors, left and right vehicle side cameras, a display, and one or more memory modules. The one or more memory modules store logic that cause the system to: determine, based on the location signal output by the one or more vehicle location sensors, whether a vehicle is on the on-ramp to merge on to the roadway; determine a direction of merging, and display image data on the display. Image data from the left vehicle side camera is displayed when it is determined that the direction of merging is to a left side of the vehicle. Image data from the right vehicle side camera is displayed when it is determined that the direction of merging is to a right side of the vehicle.

17 Claims, 6 Drawing Sheets

(51) Int. Cl.

|  |  |
|---|---|
| *G06K 9/00* | (2006.01) |
| *H04N 5/232* | (2006.01) |
| *H04N 7/18* | (2006.01) |
| *B60R 1/00* | (2006.01) |
| *H04N 5/247* | (2006.01) |

(52) U.S. Cl.
CPC ..... *G06K 9/00805* (2013.01); *H04N 5/23293* (2013.01); *H04N 7/181* (2013.01); *B60R 2300/105* (2013.01); *B60R 2300/70* (2013.01); *H04N 5/247* (2013.01)

(56) References Cited

U.S. PATENT DOCUMENTS

| | | |
|---|---|---|
| 8,207,835 B2 | 6/2012 | Schwartz et al. |
| 8,810,431 B2 | 8/2014 | Priyantha et al. |
| 9,245,448 B2 | 1/2016 | Schofield |
| 9,266,429 B2 | 2/2016 | Tippelhofer et al. |
| 9,406,234 B2 | 8/2016 | Yellambalase et al. |
| 2004/0227647 A1 | 11/2004 | Yanai |
| 2004/0257443 A1* | 12/2004 | Ueminami ................ B60R 1/00 348/148 |
| 2005/0240342 A1* | 10/2005 | Ishihara .................... B60R 1/00 701/1 |
| 2013/0182113 A1 | 7/2013 | Shih et al. |
| 2015/0274074 A1 | 10/2015 | Petrillo et al. |
| 2016/0046290 A1* | 2/2016 | Aharony ............ G06K 9/00798 701/41 |

\* cited by examiner

SYSTEMS, VEHICLES, AND METHODS FOR AUTOMATICALLY DISPLAYING IMAGE DATA WHEN A VEHICLE IS LOCATED ON AN ON-RAMP TO A ROADWAY

CROSS-REFERENCE TO RELATED APPLICATIONS

This application claims the benefit of U.S. Provisional Patent Application No. 62/419,196, filed Nov. 8, 2016, hereby incorporated by reference in its entirety.

TECHNICAL FIELD

The present specification generally relates to systems, vehicles, and methods for automatically displaying image data when a vehicle is located on an on-ramp to a roadway and, more specifically, systems, vehicles, and methods for automatically displaying image data from a left side of the vehicle or the right side of the vehicle depending on the direction the vehicle will merge from the on-ramp to the roadway.

BACKGROUND

Some vehicles display images on vehicle displays. However, the images may not be displayed when a vehicle is merging into traffic on a freeway. Accordingly, a need exists for systems, vehicles, and methods that provide a display of a vehicle's surroundings when the vehicle is merging onto the freeway without requiring the activation of a turn signal.

SUMMARY

In one embodiment, a system for automatically displaying image data when a vehicle is located on an on-ramp to a roadway is provided. The system may include one or more processors, a left vehicle side camera communicatively coupled to the one or more processors, a right vehicle side camera communicatively coupled to the one or more processors, a display communicatively coupled to the one or more processors, and one or more memory modules communicatively coupled to the one or more processors. The one or more memory modules store logic that, when executed by the one or more processors, causes the system to: determine, based on the location signal output by the one or more vehicle location sensors, whether a vehicle is on the on-ramp to merge on to the roadway; determine a direction of merging, display image data from the left vehicle side camera with the display when it is determined that the direction of merging is to a left side of the vehicle; and display image data from the right vehicle side camera on the display when it is determined that the direction of merging is to a right side of the vehicle.

In another embodiment, a vehicle configured to automatically display image data when the vehicle is located on an on-ramp to a roadway is provided. The vehicle may include one or more processors, a left vehicle side camera coupled to a left portion of the vehicle and communicatively coupled to the one or more processors, a right vehicle side camera coupled to a right portion of the vehicle and communicatively coupled to the one or more processors; a display communicatively coupled to the one or more processors; and one or more memory modules communicatively coupled to the one or more processors. The one or more memory modules store logic that, when executed by the one or more processors, causes the vehicle to: determine, based on the location signal output by the one or more vehicle location sensors, whether a vehicle is on the on-ramp to merge on to the roadway; determine a direction of merging, display image data from the left vehicle side camera on the display when it is determined that the direction of merging is to a left side of the vehicle, and display image data from the right vehicle side camera on the display when it is determined that the direction of merging is to a right side of the vehicle.

In yet another embodiment, a method for automatically displaying image data when a vehicle is located on an on-ramp to a roadway is provided. The method may include: determining, based on a location signal output by one or more vehicle location sensors, whether a vehicle is on an on-ramp to merge onto a roadway; determining a direction of merging, and displaying image data from a left vehicle side camera on a display when it is determined that the direction of merging is to a left side of the vehicle and displaying image data from a right vehicle side camera on the display when it is determined that the direction of merging is to a right side of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include systems, methods, and vehicles for automatically displaying image data when a vehicle is located on an on-ramp to a roadway. Embodiments described herein may use information from a variety of location sensors to determine whether or not a vehicle is on an on-ramp to a roadway. For example, such information may include image data from cameras, vehicle acceleration information from speed sensors, and map information from systems such as global positioning systems. As will be described in greater detail herein, image data from the right side of the vehicle or the left side of the vehicle may be displayed when it is determined that the vehicle is on an on-ramp to a roadway to aid the vehicle operator in performing a merge maneuver into traffic from the on-ramp to the roadway. The various systems, vehicles, and methods for automatically displaying image data when a vehicle is located on an on-ramp to a roadway will be described in more detail herein with specific reference to the corresponding drawings.

As used herein, the term "vehicle merge" or "merging maneuver" refers to a situation where a vehicle merges into a flow of traffic on a roadway, such as a highway.

As used herein, the term "on-ramp" may refer to a road used for accessing, or driving onto, a roadway, such as, an on-ramp to a highway.

Figure 1:
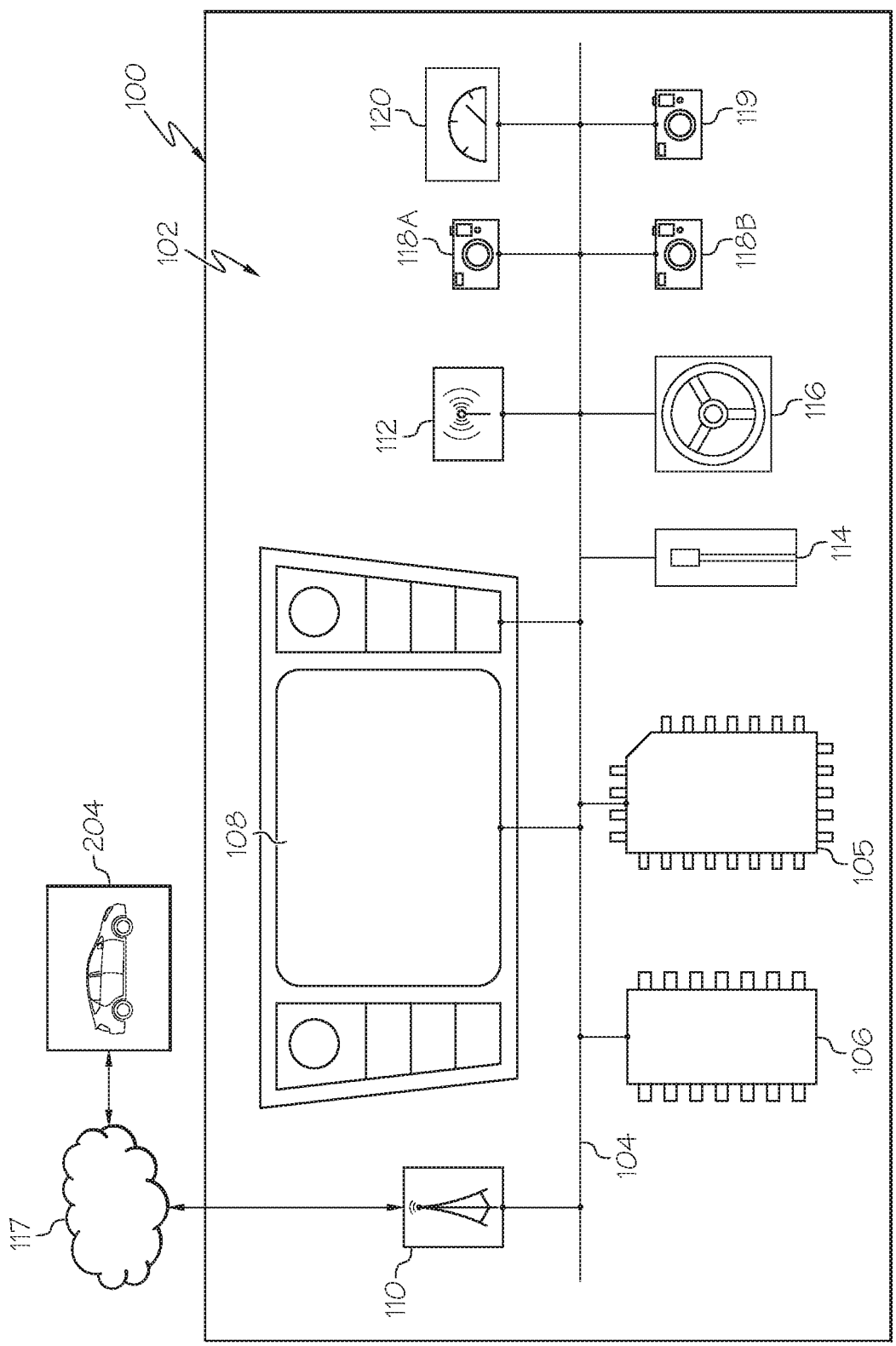
FIG. 1 depicts a schematic view of a vehicle and a system for automatically displaying image data when it is determined that a vehicle is located on an on-ramp to a roadway, according to one or more embodiments shown and described herein.

Referring now to the drawings, FIG. 1 depicts a system 102 of a vehicle 100 for automatically displaying image data when a vehicle 100 is located on an on-ramp to a roadway. The system 102 includes a communication path 104, one or more processors 105, one or more memory modules 106, a display 108, one or more vehicle location sensors 114, a left vehicle side camera 118A, and a right vehicle side camera 118B. The system 102 may further include network interface hardware 110, a proximity sensor 112, a steering angle sensor 116, a rearward facing camera 119, and a speed sensor 120. In some embodiments, the system 102 may be configured to communicate with a network 117 using the network interface hardware 110 to communicate with target object 204 (e.g., other vehicles) over a network 117 through vehicle-to-vehicle communication to send and receive information to other vehicles.

It is noted that while the vehicle 100 is generally depicted and described herein, the vehicle 100 may be any passenger vehicle such as, for example, a terrestrial, aquatic, and/or airborne vehicle. In some embodiments, the vehicle 100 may be an autonomous vehicle or a partially autonomous vehicle. When referring to autonomous or partially autonomous vehicles, it is meant to refer to vehicles having at least one drive mode wherein a human operator is not necessary to guide the vehicle 100.

Still referring to FIG. 1, the system 102 includes a communication path 104 that provides data interconnectivity between various modules disposed within the system 102. Specifically, each of the modules can operate as a node that may send and/or receive data. In some embodiments, the communication path 104 includes a conductive material that permits the transmission of electrical data signals to processors, memories, sensors, and actuators throughout the system 102. In another embodiment, the communication path 104 can be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 102 includes one or more processors 105 communicatively coupled with one or more memory modules 106. The one or more processors 105 may include any device capable of executing machine-readable instructions stored on a non-transitory computer-readable medium. Accordingly, each processor 105 may include a controller, an integrated circuit, a microchip, a computer, and/or any other computing device.

The one or more memory modules 106 are communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 102 and/or external to the system 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

Referring still to FIG. 1, the system 102 includes a display 108 for providing visual output such as, for example, maps, navigation, entertainment, information, or a combination thereof. The display 108 is coupled to the communication path 104. Accordingly, the communication path 104 communicatively couples the display 108 to other modules of the system 102. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display 108. Accordingly, each display 108 may receive mechanical input directly upon the optical output provided by the display 108. Additionally, it is noted that the display 108 can include at least one of the one or more processors 105 and the one or more memory modules 106. In some embodiments, the system 102 may include multiple displays.

Figure 5:
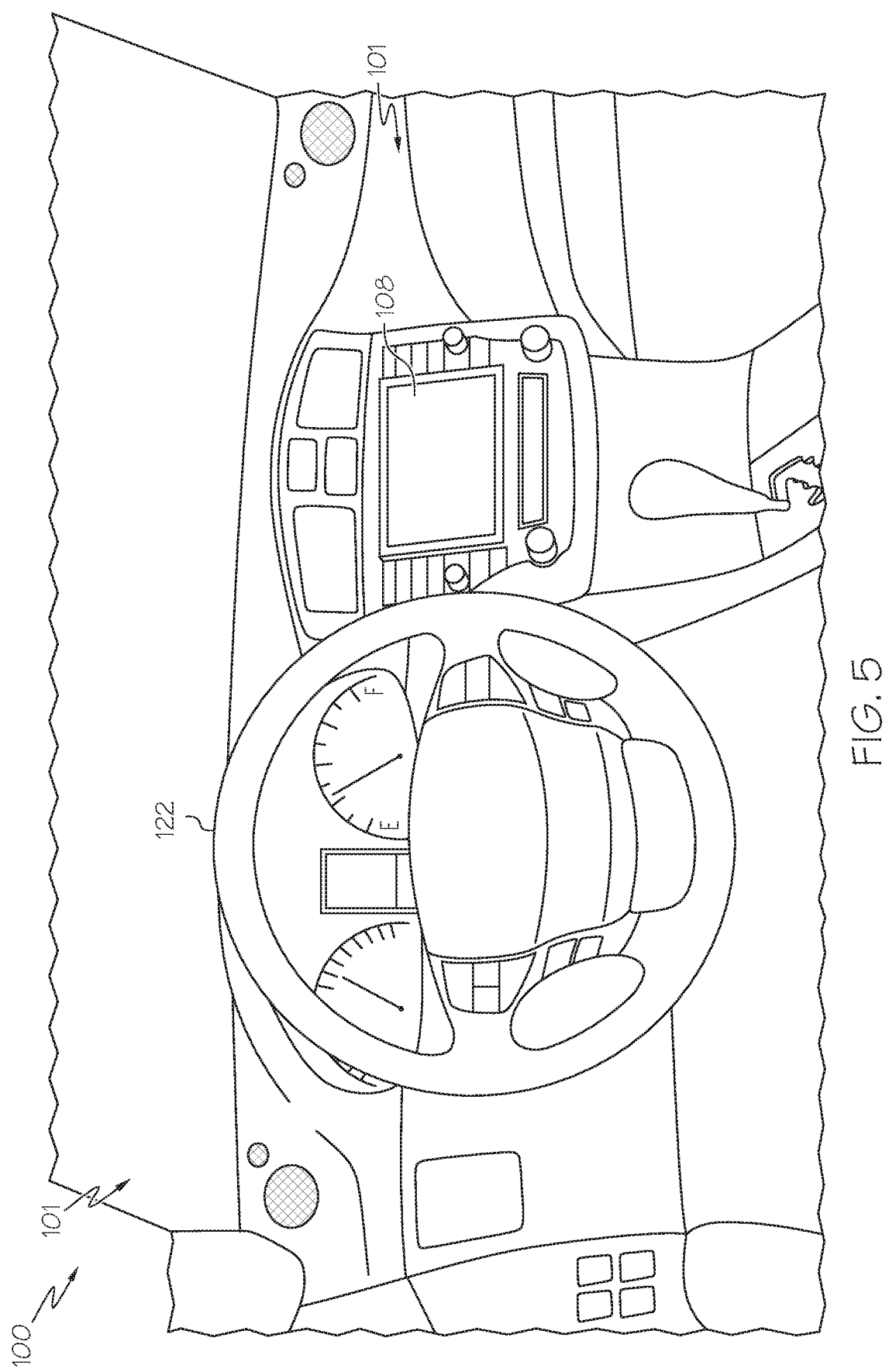
FIG. 5 depicts an interior view of the vehicle of FIG. 1, according to one or more embodiments shown and described herein.

As shown in FIG. 5, the display 108 may be coupled to a dashboard 101 of the vehicle 100. However, in other embodiments, the display 108 may be positioned elsewhere in the vehicle 100. In some embodiments, there may be multiple displays wherein image data from the left vehicle side camera 118A is displayed on one display 108 and image data from the right vehicle side camera 118B is displayed on a separate display. In yet further embodiments, the display 108 may be a heads-up display.

Referring again to FIG. 1, the system 102 further includes one or more vehicle location sensors 114 coupled to the communication path 104 such that the communication path 104 communicatively couples the one or more vehicle location sensors 114 to other modules of the system 102. The one or more vehicle location sensors 114 may be any sensor that outputs vehicle location signal indicative of the location of the vehicle 100. For example, and not as a limitation, the one or more vehicle location sensors 114 may include one or more vehicle cameras and/or a satellite antenna. Based on the location signal output by the one or more vehicle location sensors 114, the one or more processors 105 may determine relevant information about the environment of the vehicle 100 to determine whether or not the vehicle 100 is located on an on-ramp to a roadway. As will be described in greater detail herein, in some embodiments, a speed sensor 120 may be used in conjunction with the one or more vehicle location sensors 114 to determine that the vehicle 100 is located on an on-ramp to a roadway. In some embodiments one or more processors 105 may determine based on the location signal output by the one or more vehicle location sensors 114 a direction in which the vehicle 100 will merge into traffic. These various embodiments will be described in greater detail below.

In embodiments, wherein the one or more vehicle location sensors 114 include a satellite antenna, the satellite antenna may be configured to receive location signals from GPS satellites. Specifically, in one embodiment, the satellite antenna includes one or more conductive elements that interact with electromagnetic signals transmitted by GPS satellites. The received location signal is transformed into a data signal indicative of the location (e.g., latitude and longitude) of the vehicle 100 by the one or more processors 105. The one or more processors 105 may then correlate the data signal to map information stored on the one or more processors 105 or otherwise available to the one or more processors 105 to determine whether vehicle 100 is located on an on-ramp to a roadway. As described above, the one or more processors 105 may also use these location signals to determine the direction in which the vehicle 100 will merge (e.g., to the left and to the right).

In embodiments wherein the one or more vehicle location sensors 114 include one or more vehicle cameras, the location signal output by the one or more vehicles cameras includes image data. As such, the one or more vehicle cameras may include any devices having an array of sensing devices (e.g., pixels) capable of capturing image data from an environment of the vehicle 100 and may have any resolution. The one or more processors 105 may execute logic stored on the one or more memory modules 106 to perform image recognition on the received image data captured by one or more vehicle cameras. For example, the one or more memory modules 106 may include an image recognition database or algorithm to allow the one or more processors 105 to identify objects within a vicinity of the vehicle 100. Hence, from the image data, the one or more processors 105 may recognize signs or symbols indicative of the vehicle 100 being on an on-ramp to a roadway. For example, and not as a limitation, the one or more processors 105 may recognize signs indicating an entrance to an on-ramp to a roadway. In other examples, the one or more processors 105 may recognize characteristics of an on-ramp including, but not limited to, recognizing that the road on which the vehicle 100 travels, merges into a larger road in a direction forward of the vehicle 100.

To determine a direction of merging, for example, and not as a limitation, the one or more processors 105 may determine based on the image data from the one or more vehicle cameras that traffic is to a right or left side of the vehicle 100. In operation, the system 102, based on the one or more vehicle cameras, may be able to detect a target object (e.g., other vehicles), using image recognition, within a vicinity of the vehicle 100. If the target object is to a left side of the vehicle 100, than it may be determined that the vehicle 100 may merge to the left. However, if the target object is to a right side of the vehicle 100, then it may be determined that the vehicle 100 may merge to the right. In some embodiments, the one or more processors 105 may determine a direction of merging by recognizing that a current road that the vehicle 100 is on merges into larger roadway ahead of the vehicle 100 and the direction that the current road merges into the larger roadway is in a direction to the right side or left side of the vehicle 100.

The system 102 further includes a left vehicle side camera 118A and a right vehicle side camera 118B coupled to the communication path 104 such that the communication path 104 communicatively couples the left vehicle side camera 118A and the right vehicle side camera 118B to other modules of the system 102. The left vehicle side camera 118A and the right vehicle side camera 118B may include any devices having an array of sensing devices (e.g., pixels) capable of capturing image data from an environment of the vehicle 100. The left vehicle side camera 118A and the right vehicle side camera 118B may have any resolution.

Figure 3:
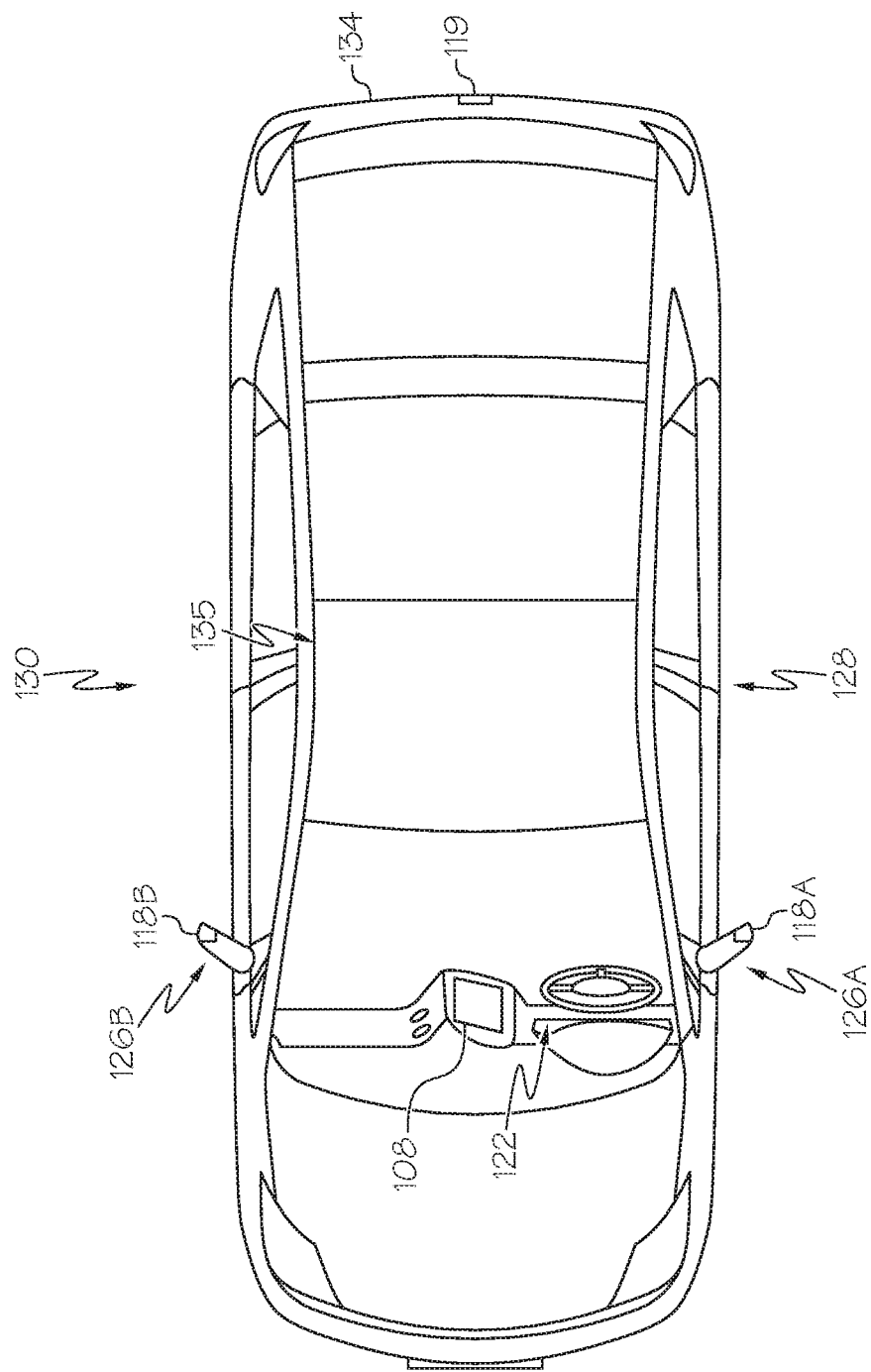
FIG. 3 depicts a top view of the vehicle of FIG. 1, according to one or more embodiments shown and described herein.

Referring also to FIG. 3, the left vehicle side camera 118A may be coupled to a left side 128 of the vehicle 100. In some embodiments, the left vehicle side camera 118A may be coupled to a left side mirror 126A of the vehicle 100. However, it is contemplated the left vehicle side camera 118A may be coupled to other portions of the vehicle 100. The left vehicle side camera 118A is configured to capture image data of an environment of the vehicle 100 on the left side 128 of the vehicle 100. In some embodiments, the left vehicle side camera 118A may capture image data of the environment of the vehicle 100 directly next to the vehicle 100 and/or trailing behind the vehicle 100 on the left side 128 of the vehicle 100.

The right vehicle side camera 118B may be coupled to a right side 130 of the vehicle 100. In some embodiments, the right vehicle side camera 118B may be coupled to a right side mirror 126B of the vehicle 100. However, it is contemplated the right vehicle side camera 118B may be coupled to other portions of the vehicle 100. The right vehicle side camera 118B is configured to capture image data of an environment of the vehicle 100 on the right side 130 of the vehicle 100. In some embodiments, the right vehicle side camera 118B may capture image data of the environment of the vehicle 100 directly next to the vehicle 100 and/or trailing behind the vehicle 100 on the right side 130 of the vehicle 100.

In some embodiments, the one or more processors 105 may execute logic stored on the one or more processors 105 to perform image recognition on the image data captured by the right vehicle side camera 118B and the left vehicle side camera 118A. Similar to the one or more vehicle location sensors 114 described above, image data from the left vehicle side camera 118A and the right vehicle side camera 118B may be used to aid the system 102 in determining whether or not the vehicle 100 is located on an on-ramp to a roadway and a direction in which the vehicle 100 will merge.

When it is determined by the one or more processors 105 that the vehicle 100 is merging onto a roadway and a direction of merging has been determined, image data from either the left vehicle side camera 118A or the right vehicle side camera 118B may be displayed on the display 108. Hence, if it is determined that the direction of merging is to the left side 128 of the vehicle 100, image data from the left vehicle side camera 118A is displayed on the display 108. If it is determined that the direction of merging is to the right side 130 of the vehicle 100, image data from the right vehicle side camera 118B is displayed on the display 108. It is contemplated that in some embodiments, image data from both the left vehicle side camera 118A and the right vehicle side camera 118B may be displayed concurrently. In some embodiments, instead of displaying image data from the left vehicle side camera 118A and the right vehicle side camera 118B, image data of a right portion field of view is displayed when the vehicle 100 is merging to the right and a left portion field of view is displayed when the vehicle is merging to the left. In such embodiments, the vehicle 100 may include one or more cameras capable of capturing image data from a right portion field of view and a left portion field of view of the vehicle 100.

Referring again to FIG. 1, the system 102 may further include network interface hardware 110 for communicatively coupling the system 102 with a network 117. The network interface hardware 110 can be communicatively coupled to the communication path 104 and can be any device capable of transmitting and/or receiving data via the network 117. Accordingly, the network interface hardware 110 can include a communication transceiver for sending and/or receiving any wired or wireless communication. For example, the network interface hardware 110 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 110 includes hardware configured to operate in accordance with the Bluetooth wireless communication protocol. In another embodiment, network interface hardware 110 may include a Bluetooth send/receive module for sending and receiving Bluetooth communications to/from the one or more remote devices. Some embodiments may not include network interface hardware 110.

As described above, the system 102 may communicate, through the network interface hardware 110, with a network 117 to communicatively couple the system 102 with target objects 204 through vehicle-to-vehicle communication. For instance, the vehicle 100 and another vehicle (target object 204) may send and receive information relevant to speed, road conditions, oncoming obstacles, position on the roadway, etc. In one embodiment, the network 117 is a personal area network that utilizes Bluetooth technology to communicatively couple the system 102 and the one or more remote devices. In other embodiments, the network 117 may include one or more computer networks (e.g., a personal area network, a local area network, or a wide area network), cellular networks, satellite networks and/or a global positioning system and combinations thereof. Accordingly, the system 102 can be communicatively coupled to the network 117 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 4:
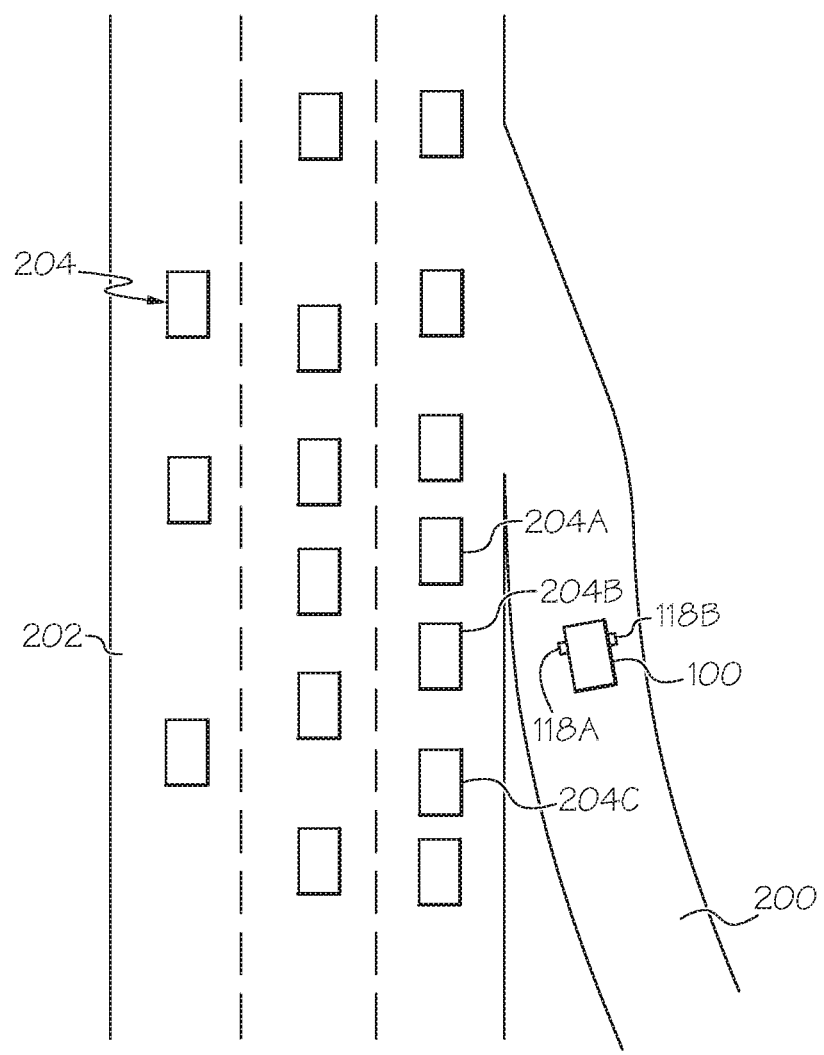
FIG. 4 depicts the vehicle of FIG. 3 on an on-ramp to a roadway according to one or more embodiments shown and described herein.

The system 102 may further include a proximity sensor 112 coupled to the communication path 104 such that the communication path 104 communicatively couples the proximity sensor 112 to other modules of the system 102. The proximity sensor 112 may be any device capable of outputting a proximity signal indicative of proximity of an object to the proximity sensor 112. In some embodiments, the proximity sensor 112 may include a laser scanner, a capacitive displacement sensor, a Doppler Effect sensor, an eddy-current sensor, an ultrasonic sensor, a magnetic sensor, an optical sensor, a radar sensor, a sonar sensor, or the like. Some embodiments may not include the proximity sensor 112. In some embodiments, the system 102 may be configured to determine the presence of target objects 204 (e.g., other vehicles or obstacles such as shown in FIG. 4) relative to the vehicle 100 based on a proximity signal outputted by the proximity sensor 112. In some embodiments, the system 102 may be able to determine a direction of merging based on the proximity signal outputted by the proximity sensor 112. For example, and not as a limitation, if the one or more processors 105 determine, based on the proximity signal output by the proximity sensor 112, that a target object 204 is to a left side 128 of the vehicle 100, the system 102 may determine that the vehicle 100 will merge to the left. Similarly, if the one or more processors 105 determine, based on the proximity signal output by the proximity sensor 112, that a target object 204 is to a right side 130 of the vehicle 100, the system 102 may determine that the vehicle 100 will merge to the right. In some embodiments, there is no proximity sensor 112.

In some embodiments, the system 102 includes a steering angle sensor 116 communicatively coupled to the one or more processors 105 over the communication path 104. The steering angle sensor 116 may be any sensor capable of outputting a steering angle signal indicative of a steering angle of the steering wheel system 122 (shown in FIGS. 3 and 5). In such embodiments, a direction of merging may be determined based at least on the steering angle signal output by the steering angle sensor 116. For example, if the one or more processors 105 determine, based on the steering angle signal output by the steering angle sensor 116, that the vehicle 100 is being steered to the right, than the direction of merging is determined to be to a right side 130 of the vehicle 100. Similarly, if the one or more processors 105 determine, based on the steering angle signal output by the steering angle sensor 116, that the vehicle 100 is being steered to the left, than the direction of merging is determined to be to a left side 128 of the vehicle 100.

Still referring to FIG. 1, the system 102 may further include a rearward facing camera 119 communicatively coupled to the one or more processors 105 over the communication path 104. Referring to FIG. 3, the rearward facing camera 119 may be configured to capture image data of an environment of the vehicle 100 to a rear from the vehicle 100. As such the rearward facing camera 119 may be coupled to the vehicle 100 at a number of locations. For example, and not as a limitation, the rearward facing camera 119 may be coupled to a rear bumper 134 of the vehicle 100. In some embodiments, the rearward facing camera 119 may be coupled at a position adjacent to a roof 135 of the vehicle 100. It is contemplated that in some embodiments, that image data may also be displayed on the display 108 from a rear of the vehicle 100 when it is determined that the vehicle 100 is on an on-ramp to a roadway. In some embodiments, there is no rearward facing camera 119.

As noted hereinabove, the system 102 may further include a speed sensor 120 communicatively coupled to the one or more processors 105 over the communication path 104. The speed sensor 120 may include any sensor capable of outputting a speed signal indicative of the acceleration and/or speed of the vehicle 100. In some embodiments, acceleration above a predetermined threshold and/or a speed of the vehicle 100 traveling above a predetermined threshold, as determined by the one or more processors 105 based on the speed signal of the speed sensor 120, may be indicative of the vehicle 100 being on an on-ramp to a highway. The predetermined threshold acceleration may be any acceleration indicative of the vehicle 100 merging onto a roadway. For example, when a vehicle 100 merges onto a freeway, the vehicle 100 uses the on-ramp to quickly accelerate to a speed for traveling on the freeway, typically the speed limit. Hence, a predetermined threshold acceleration and/or speed may be any acceleration or speed typical for merging onto a freeway. For example, and not as a limitation, a predetermined threshold acceleration may include increasing the speed of the vehicle 100 from 0 mph to 60 mph in under about 20 seconds, under about 18 seconds, and under about 15 seconds. Similarly a predetermined threshold speed may be a speed greater than 60 mph. This speed information may be used in conjunction within the location signal output by the one or more vehicle location signals by the one or more processors 105 to determine that the vehicle 100 is on an on-ramp to a roadway. For example, vehicle 100 acceleration/speed and object recognition of image data from one or more vehicle cameras may allow the one or more processors 105 to determine that the vehicle 100 in on an on-ramp to a roadway. However, in some embodiments, there may not be a speed sensor 120.

Figure 2:
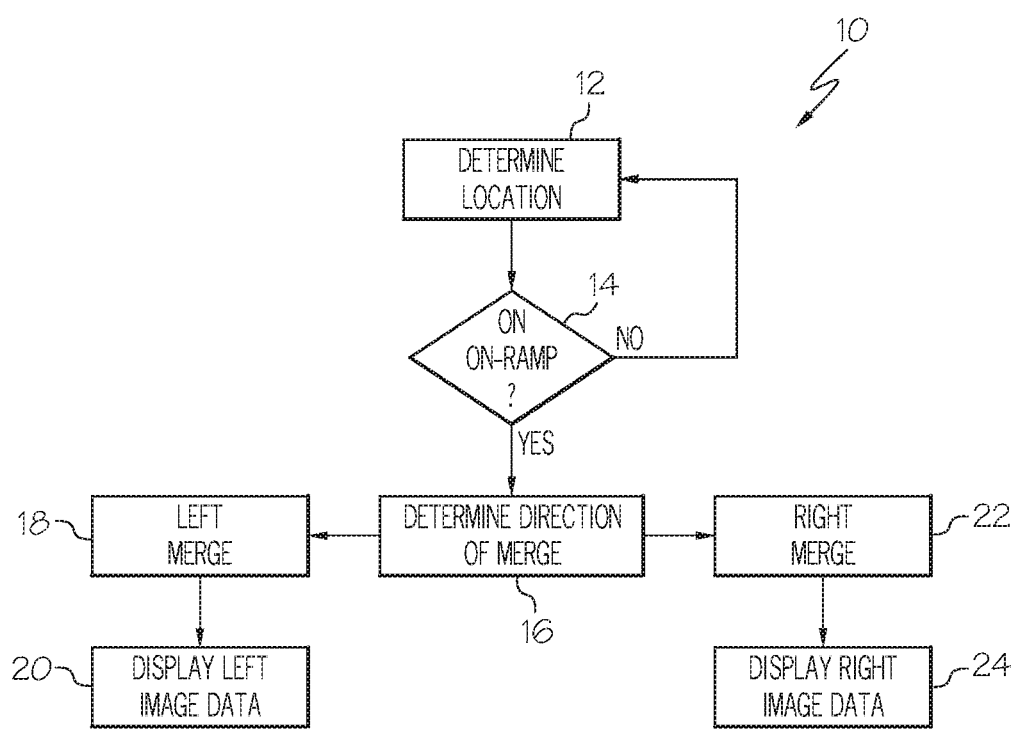
FIG. 2 depicts a flowchart illustrating a method for automatically displaying image data when it is determined that a vehicle is located on an on-ramp to a roadway, according to one or more embodiments shown and described herein.

FIG. 2 depicts a flowchart 10 for automatically displaying image data during a vehicle merge. Referring to FIGS. 1 and 2 collectively, at blocks 12 and 14, the one or more processors 105 determine a location of the vehicle 100 and if the vehicle 100 is on an on-ramp to a roadway. Referring also to FIG. 4, as an example, a vehicle 100 having a left vehicle side camera 118A and a right vehicle side camera 118B is depicted. As described herein, the location of the vehicle 100 may be determined based on a location signal output by one or more vehicle location sensors 114. As an example, and not as a limitation, in embodiments wherein the one or more vehicle location sensors 114 include one or more vehicle cameras (which may include one or more of the left vehicle side camera 118A, the right vehicle side camera 118B, and the rearward facing camera 119), the one or more processors 105 may receive image data from the one or more vehicle cameras and, based on logic stored on the one or more memory modules 106, perform object recognition to determine location of the vehicle 100 and whether the vehicle 100 is on an on-ramp 200 to a highway. The system 102 may further use the acceleration signal output by the speed sensor 120 to confirm that the vehicle 100 is on an on-ramp 200 to a roadway 202. As described herein, acceleration/speed above a predetermined threshold may be indicative of the vehicle 100 merging onto a roadway 202. In addition to or in lieu of the one or more vehicle cameras and the speed sensor 120, the one or more vehicle location sensors 114 may include a satellite antenna to receive GPS information to determine a location of the vehicle 100. Based on the GPS information, it may be determined that the vehicle 100 is on an on-ramp 200 to a roadway 202 (block 14). In the example shown in FIG. 4, the system 102 would determine that the vehicle 100 is on an on-ramp 200 to a roadway 202, based on the location signal output by the one or more vehicle location sensors 114.

At block 16 of FIG. 2, the system 102 determines the direction the vehicle 100 will merge. As described herein, the direction the vehicle 100 will merge may be determined based on the location signal of the one or more vehicle location sensors 114, image data from the left vehicle side camera 118A and the right vehicle side camera 118B, a steering angle sensor 116, a proximity sensor 112, and/or vehicle-to-vehicle communication. Referring to FIG. 4, the one or more processors 105 would, based on any of the above described sensor output signals, determine that the vehicle 100 will merge to the left. The above listed tools for determining a direction of merging may be used exclusively or in conjunction with one another to aid the system 102 in determining the direction the vehicle 100 will merge and are described in operation below.

As described herein, in some embodiments, the one or more vehicle location sensors 114 include one or more cameras that output image data to the one or more processors 105. The one or more processors 105 may execute logic stored on the one or more memory modules 106 to perform object recognition to determine the direction that the vehicle 100 will merge. For example, and not as a limitation, when the one or more processors 105 recognize target objects 204 (e.g., other vehicles) on a roadway 202 to a right of the vehicle 100, the one or more processors 105 may determine that the vehicle 100 will merge to the right side of the vehicle 100. If, on the other hand, the one or more processors 105 recognize vehicles on a roadway 202 to the left of the vehicle 100, the one or more processors 105 may determine that the vehicle 100 will merge to the left. Similar object recognition may be performed on image data from the left vehicle side camera 118A and the right vehicle side camera 118B to determine the direction the vehicle 100 will merge. In embodiments, wherein the one or more vehicle location sensors 114 include a satellite antenna, a GPS signal may allow the one or more processors 105 to determine which direction the vehicle 100 will merge based on map information. For example, map information may include the location of various on-ramps and the direction from which those on-ramps merge onto a roadway. Based on the GPS signal, the position of the vehicle 100 may be correlated to the corresponding position on a map. Hence, if the vehicle is determined to be on an on-ramp to the roadway, it may further be determined from which direction the on-ramp, and therefore the vehicle 100, will merge onto the roadway.

In embodiments including a steering angle sensor 116 that outputs a steering angle signal, the one or more processors 105 may determine the direction the vehicle 100 will merge based on the steering angle signal. For example, if the steering angle signal indicates that the vehicle 100 is being steered to the left, the one or more processors 105 may determine that the vehicle 100 will merge to the left. If the steering angle signal indicates that the vehicle 100 is being steered to the right, the one or more processors 105 may determine that the vehicle 100 will merge to the right.

In yet further embodiments, network interface hardware 110 may allow the system 102 to send and receive information from target objects 204 (e.g., vehicle-to-vehicle communication). Information received from the other vehicles may allow the one or more processors 105 to determine where a target object 204 is located relative to the vehicle 100. Hence, if target object 204 is located to a left of the vehicle 100, it may be determined that the vehicle 100 will merge to the left and if target object 204 is located to a right of the vehicle 100, it may be determined that the vehicle 100 will merge to the right.

It is noted that a proximity sensor 112 may also aid the system 102 in determining the direction of merge. Specifically, the proximity sensor 112 may output a proximity signal indicative of the side to which a target object 204 is located. Hence, based on the sensed position of the target object 204 relative to the vehicle 100, the one or more processors 105 may determine whether the direction of merging is to the left or the right.

Once the direction of merge (e.g., to the left (block 18) or to the right (block 22)) is determined, image data is displayed corresponding to the direction of merge (blocks 20 and 24). As described herein with reference to FIG. 4, the one or more processors 105 would determine that the vehicle 100 will merge to the left (block 18). Once this is determined, image data from the left camera would be displayed on a display 108 (see FIG. 5) from the left vehicle side camera 118A (block 20). However, in the event that the direction of merge is determined to be to a right side 130 of the vehicle 100 (block 22), image data from the right vehicle side camera 118B would be displayed on the display 108 (block 24). In some embodiments, it is contemplated that both left and right image data may be shown concurrently. In other embodiments, image data from the rearward facing camera 119 may be displayed concurrently with image data from the left and/or right vehicle side cameras 118A, 118B.

Figure 6:
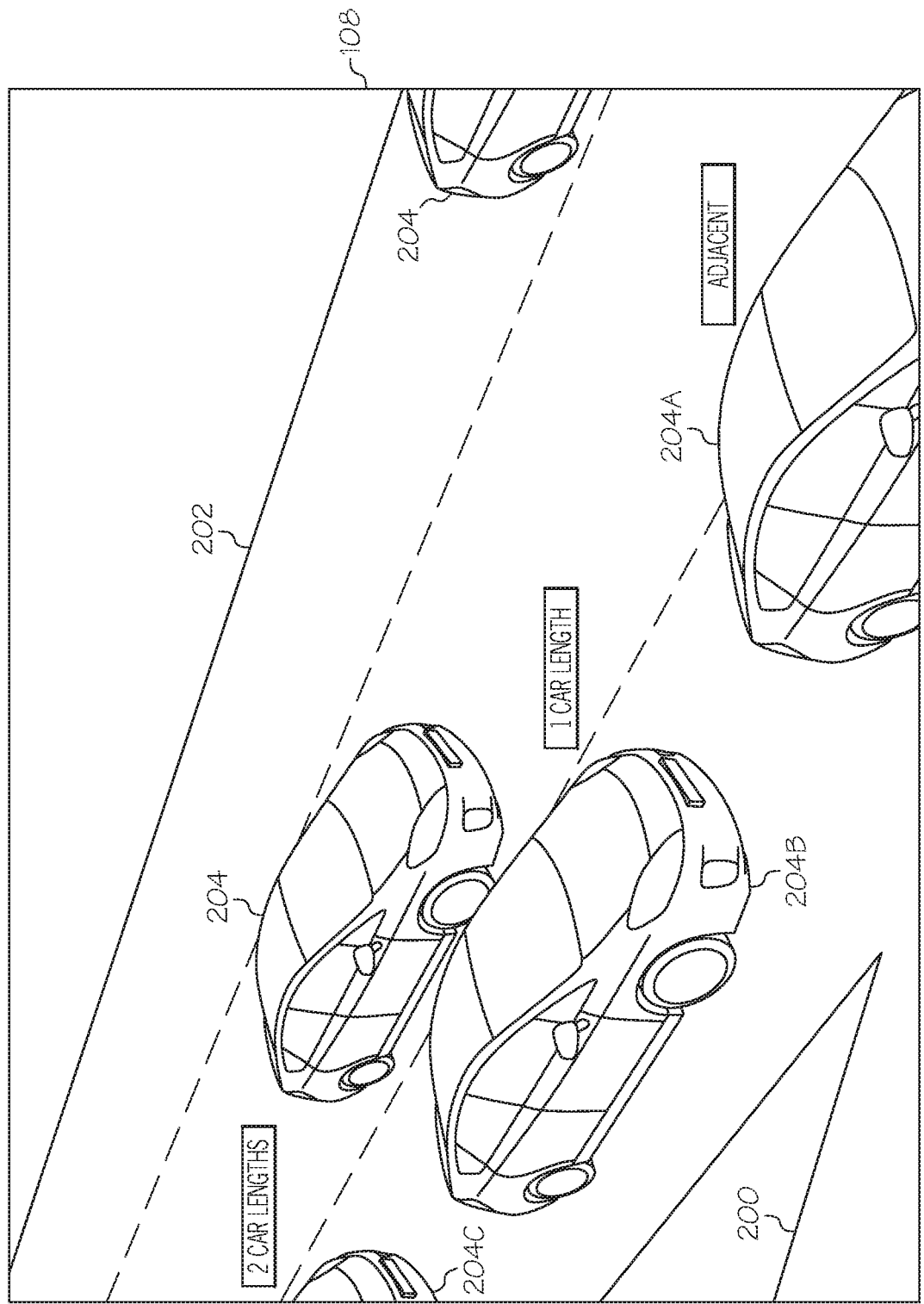
FIG. 6 depicts a display of the vehicle of FIG. 1, according to one or more embodiments shown and described herein.

Referring to FIG. 6, an example is depicted of what may be displayed on the display 108 when it is determined that the vehicle 100 is on an on-ramp 200 to a roadway 202. In this case, the system 102 has determined that the vehicle 100 is merging to the left. Hence, image data from a left vehicle side camera 118A is displayed. As shown, image data may show an environment of the vehicle 100 to a left side of the vehicle 100. As described herein, image data from the environment to the right side of the vehicle 100 would be displayed if it was determined that the vehicle 100 was merging to a right side of the vehicle 100. It is noted that in some embodiments, the image data displayed on the display 108 may not cover the entire display 108, as illustrated, but may only cover a portion of the display 108.

In some embodiments, the one or more processors 105 may execute logic to overlay the image data to indicate the position of target objects 204 (e.g., other vehicles) relative to the vehicle 100. As such, the one or more processors 105 execute logic to perform image recognition of the image data to determine the location of target objects 204 within the image data. The one or more processors 105 may then execute logic to generate an overlay indicating the location of the target objects 204 over the displayed image data. As an example, and not a limitation, a target object 204A that is adjacent to the vehicle 100 is labeled "ADJACENT." A target object 204B that is one car behind the vehicle 100 is labeled "1 CAR LENGTH." A target object 204C that is two car lengths behind the vehicle 100 is labeled "2 CAR LENGTHS." However, other labeling schemes are contemplated. For example, distance may be displayed in feet and/or meters. In some embodiments, a vehicle operator may indicate a preference to the units in which relative distances of target objects 204 from the vehicle 100 are displayed. In some embodiments, the overlay may simply highlight the target objects 204 to emphasize to a vehicle operator the location of the target object 204 relative to the vehicle 100. In some embodiments, the color in which the target object 204 is highlighted may be indicative of the proximity of the target object 204 relative to the vehicle 100. For example, a target object 204 highlighted in blue may indicate that the target object 204 is at a distance away from vehicle 100 so as not to interfere with an upcoming merge maneuver of the vehicle 100. A target object 204 highlighted in red (or in a flashing color) may indicate that the target object 204 is at a position that may interfere with an upcoming merge maneuver of the vehicle 100. In other embodiments, there may be no overlay.

The display of image data from the right vehicle side camera 118B and/or the left vehicle side camera 118A may be automatically terminated. There may be a variety of ways in which the display 108 of image data from the right vehicle side camera 118B and/or the left vehicle side camera 118A is automatically terminated. For example, in one embodiment, the one or more processors 105 execute logic stored on the one or more memory modules 106 to terminate the display 108 of the image data from the right vehicle side camera 118B and the left vehicle side camera 118A when the vehicle 100 has reached a predetermined speed and a predetermined time has passed. For example, a predetermined speed may be based on a speed limit of the roadway 202 to which the vehicle 100 has merged. For example, if the speed limit is 65 mph, a predetermined speed for terminating the display 108 of image data may be above 60 mph. A predetermined time may be any time suitable for completing a merge onto a roadway 202 from an on ramp. For example, and not as a limitation, the predetermined time may be greater than about 30 seconds. For example, about 45 seconds, about 1 minute, about 1.5 minutes, etc. In other embodiments, the display of image data may be automatically terminated based on the location signal output by the one or more vehicle location sensors 114. For example, the one or more processors 105, based on the location signal, may determine the vehicle 100 is no longer located on an on-ramp 200 to a roadway 202 or is a predetermined distance from a position wherein the on-ramp 200 has merged into the roadway 202. Such predetermined distances may include but are not limited to a greater than or less than about 1 mile, about one-half mile, and about one-eighth mile.

It should now be understood that the systems, vehicles, and methods described herein allow for image data to be automatically displayed when it is determined that the vehicle is located on an on-ramp to a roadway. Furthermore, the systems, vehicles, and methods described herein determine a direction of merging and display image data corresponding to the direction of merging. Hence, when it is determined that the vehicle will be merging to the left, image data from the left side of the vehicle will be displayed. Similarly, when it is determined that the vehicle will be merging to the right, image data from the right side of the vehicle will be displayed. By automatically displaying image data from the left or right sides of the vehicle, the vehicle operator may better determine when to complete a successful merging maneuver.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for automatically displaying image data when a vehicle is located on an on-ramp to a roadway, the system comprising:
   one or more processors;
   a left vehicle side camera communicatively coupled to the one or more processors;
   a right vehicle side camera communicatively coupled to the one or more processors;
   a display communicatively coupled to the one or more processors;
   one or more vehicle location sensors communicatively coupled to the one or more processors and configured to output a location signal; and
   one or more memory modules communicatively coupled to the one or more processors, the one or more memory modules storing logic that when executed by the one or more processors cause the system to:
   determine, based on the location signal output by the one or more vehicle location sensors, whether the vehicle is on the on-ramp to merge onto the roadway;
   determine a direction of merging;
   display image data from the left vehicle side camera on the display when it is determined that the direction of merging is to a left side of the vehicle and in response to determining that the vehicle is on the on-ramp;
   display image data from the right vehicle side camera on the display when it is determined that the direction of merging is to a right side of the vehicle and in response to determining that the vehicle is on the on-ramp;
   determine a predetermined speed, wherein the predetermined speed is based on a speed limit of the roadway on to which the vehicle is merging; and
   terminate the display of the image data from the right vehicle side camera or the left vehicle side camera when the vehicle has reached the predetermined speed and a predetermined time has passed.

2. The system of claim 1, further comprising a rearward facing camera communicatively coupled to the one or more processors, wherein the one or more processors execute logic stored on the one or more memory modules to display image data from the rearward facing camera when it is determined that the vehicle is on the on-ramp.

3. The system of claim 1, wherein the one or more processors execute logic stored on the one or more memory modules to display an overlay over the image data displayed on the display to highlight a location of a target object relative to the vehicle.

4. The system of claim 1, wherein the one or more vehicle location sensors comprises a global positioning system.

5. The system of claim 1, wherein:
   the one or more vehicle location sensors comprise one or more vehicle cameras; and
   the one or more processors execute logic stored on the one or more memory modules to determine whether the vehicle is on the on-ramp by performing object recognition on image data from the one or more vehicle cameras to recognize that the vehicle is on the on-ramp.

6. The system of claim 1, wherein:
   the one or more vehicle location sensors comprise a speed sensor to output a signal indicative of an acceleration of the vehicle; and
   the one or more processors execute logic stored on the one or more memory modules to determine whether the vehicle is on the on-ramp to merge onto the roadway by determining the acceleration of the vehicle and determining that the vehicle is on the on-ramp when the acceleration of the vehicle is above a predetermined threshold.

7. A vehicle configured to automatically displaying image data when a vehicle is located on an on-ramp to a roadway, the vehicle comprising:
   one or more processors;
   a left vehicle side camera coupled to a left portion of the vehicle and communicatively coupled to the one or more processors;
   a right vehicle side camera coupled to a right portion of the vehicle and communicatively coupled to the one or more processors;
   a display communicatively coupled to the one or more processors;
   one or more vehicle location sensors communicatively coupled to the one or more processors and configured to output a location signal; and
   one or more memory modules communicatively coupled to the one or more processors, the one or more memory modules storing logic that when executed by the one or more processors cause the vehicle to:
   determine, based on the location signal output by the one or more vehicle location sensors, whether the vehicle is on the on-ramp to merge onto the roadway;
   determine a direction of merging;
   display image data from the left vehicle side camera on the display when it is determined that the direction of merging is to a left side of the vehicle and in response to determining that the vehicle is on the on-ramp;
   display image data from the right vehicle side camera on the display when it is determined that the direction of merging is to a right side of the vehicle and in response to determining that the vehicle is on the on-ramp;
   determine a predetermined speed, wherein the predetermined speed is based on a speed limit of the roadway on to which the vehicle is merging; and
   terminate the display of the image data from the right vehicle side camera or the left vehicle side camera when the vehicle has reached the predetermined speed and a predetermined time has passed.

8. The vehicle of claim 7, further comprising a rearward facing camera communicatively coupled to the one or more processors, wherein the one or more processors execute logic stored on the one or more memory modules to display image data from the rearward facing camera when it is determined that the vehicle is on the on-ramp.

9. The vehicle of claim 7, wherein the one or more processors execute logic stored on the one or more memory modules to display an overlay over the image data displayed on the display to highlight a location of a target object relative to the vehicle.

10. The vehicle of claim 7, wherein:
    the one or more vehicle location sensors comprise one or more vehicle cameras; and
    the one or more processors execute logic stored on the one or more memory modules to determine whether the vehicle is on the on-ramp to merge onto the roadway comprises performing object recognition on image data from the one or more vehicle cameras to recognize that the vehicle is on the on-ramp.

11. The vehicle of claim 7, further comprising:
    a steering wheel system; and
    a steering angle sensor coupled to the steering wheel system and communicatively coupled to the one or more processors, wherein:

the steering angle sensor outputs a steering angle signal; and the one or more processors execute logic stored on the one or more memory modules to determine the direction of merging based on the steering angle signal output by the steering angle sensor.

12. A method for automatically displaying image data when a vehicle is located on an on-ramp to a roadway, the method comprising:

determining, based on a location signal output by one or more vehicle location sensors, whether the vehicle is on the on-ramp to merge onto the roadway;

determining a direction of merging;

displaying image data from a left vehicle side camera on a display when it is determined that the direction of merging is to a left side of the vehicle and in response to determining that the vehicle is on the on-ramp;

displaying image data from a right vehicle side camera on the display when it is determined that the direction of merging is to a right side of the vehicle and in response to determining that the vehicle is on the on-ramp;

determining a predetermined speed, wherein the predetermined speed is based on a speed limit of the roadway on to which the vehicle is merging; and terminating the display of the image data from the right vehicle side camera or the left vehicle side camera when the vehicle has reached the predetermined speed and a predetermined time has passed.

13. The method of claim 12, further comprising displaying image data from a rearward facing camera on the display when it is determined that the vehicle is on the on-ramp.

14. The method of claim 12, further comprising displaying an overlay over the image data displayed on the display to highlight a location of a target object relative to the vehicle.

15. The method of claim 12, wherein determining whether the vehicle is on the on-ramp to merge onto the roadway comprises performing object recognition on image data from one or more vehicle cameras to recognize that the vehicle is on the on-ramp.

16. The method of claim 12, wherein determining whether the vehicle is on the on-ramp to merge onto the roadway comprises determining an acceleration of the vehicle, based on an acceleration signal output by a speed sensor, wherein the acceleration of the vehicle being above a predetermined threshold is indicative of the vehicle being on the on-ramp.

17. The method of claim 12, wherein the direction of merging is determined based on at least one of the location signal output by the location signal output by the one or more vehicle location sensors and the image data output by at least one of the right vehicle side camera and the left vehicle side camera.

* * * * *